United States Patent
Hoylman et al.

(10) Patent No.: US 12,158,550 B2
(45) Date of Patent: *Dec. 3, 2024

(54) SYSTEM AND METHOD OF MEASURING AN ENVIRONMENTAL CONTAMINANT, AND RADON MONITOR FOR USE WITH THE SAME

(71) Applicant: Protect Environmental, LLC, Louisville, KY (US)

(72) Inventors: Kyle Hoylman, Louisville, KY (US); Chris Bonniwell, Cedarburg, WI (US); Christopher Ferguson, Noblesville, IN (US)

(73) Assignee: PROTECT ENVIRONMENTAL, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,280

(22) Filed: Jan. 31, 2023

(65) Prior Publication Data
US 2023/0176235 A1    Jun. 8, 2023

Related U.S. Application Data

(63) Continuation of application No. 17/514,830, filed on Oct. 29, 2021, now Pat. No. 11,598,888.

(60) Provisional application No. 63/107,954, filed on Oct. 30, 2020.

(51) Int. Cl.
*G01T 1/178*    (2006.01)
*G01T 7/00*    (2006.01)

(52) U.S. Cl.
CPC ............... *G01T 1/178* (2013.01); *G01T 7/00* (2013.01)

(58) Field of Classification Search
CPC .................................. G01T 1/178; G01T 7/00
See application file for complete search history.

(56) References Cited

PUBLICATIONS

Miles et al., "A wireless solution for radon gas detection," IEEE, The 2nd Microsystems and Nanoelectronics Research Conference pp. 88-91. (Year: 2009).*
Ecosense, RadonEye Pro, downloaded Sep. 6, 2024.
Radalink Radon Monitoring Systems, Radalink AirCat Specifications, downloaded Sep. 6, 2024.

* cited by examiner

*Primary Examiner* — Kiho Kim
(74) *Attorney, Agent, or Firm* — Stites & Harbison, PLLC; Terry L. Wright; James R. Hayne

(57) ABSTRACT

A method of measuring an environmental contaminant includes the steps of dividing a target environment into a plurality of spaces, placing a monitor in each space, uploading device data from each monitor, and processing the device data to determine a level of environmental contamination within each space. Each monitor is configured to measure a level of an environmental contaminant within the space for a sample period. A radon monitor includes a radon sensor configured to detect radon decay events, an environmental sensor configured to measure an ambient condition of air surrounding the radon sensor, a processor configured to record device data including a count of a number of radon decay events and the ambient conditions, and a communication means for transmitting the device data. A system includes a plurality of monitors, a receiving device for receive device data from each monitor, and a cloud computer to process the device data.

21 Claims, 10 Drawing Sheets

SYSTEM AND METHOD OF MEASURING AN ENVIRONMENTAL CONTAMINANT, AND RADON MONITOR FOR USE WITH THE SAME

RELATED APPLICATIONS

This application is a continuation of U.S. patent application Ser. No. 17/514,830, filed Oct. 29, 2021, and which claims priority from U.S. Provisional Application Ser. No. 63/107,954, filed Oct. 30, 2020, the entire disclosure of which is incorporated herein by this reference.

TECHNICAL FIELD

The present invention relates generally to monitoring environmental contaminants. More particularly, the present invention relates to a system and method of continuous radon monitoring in which a plurality of radon monitors continuously detect decay events and communicate that data to a remote computer.

BACKGROUND

Radon is the second leading cause of lung cancer in the US, and is nearly an ubiquitous threat for habitable structures across the country. Analysis of radon concentrations within residential dwellings and commercial properties, has become an increasingly common evaluation during property transactions. In some instances, such evaluations are a mandatory component of the transaction required by the lending institution (e.g. Fannie Mae, Freddie Mac) and/or state/federal agency (e.g. Housing and Urban Development—HUD). Analyses are performed using a variety of established methodologies.

In single structure residential properties, a certified continuous radon monitor (CRM) is common. For multifamily and extended structures, passive (e.g., charcoal adsorption) sampling devices are more commonly utilized. While a minimum 48 hour sample period is utilized, the CRM provides hourly averages compared to the 48 hour average of passive devices. Consequently, elevated passive sample results must be verified with either duplicate samples at every location or a repeated sampling event. The former increases costs, and the latter deleteriously protracts the property transaction process.

In some jurisdictions, rather than focusing on evaluating the levels of radon concentration at a specified location during a sample period, sensors are placed in a variety of areas where people spend time during a day. Data from each of these multiple sensors is then aggregated and weighted based on the amount of time a person is projected to be within each of the areas. In this way, an overall daily exposure level for an individual moving between the areas is calculated.

With respect to radon sensors in particular, a typical active radon sensor that detects alpha particles uses a photodiode as the sensor surrounded by a chamber. Alpha particles hitting the photodiode create a number of electron-hole pairs which cause a small current to be generated. These current signals can be detected and counted to provide a measure of the radon concentration within the chamber. For ease of manufacturing, typical chambers are cylinders or half spheres. However, each of these shapes create their own electromagnetic fields which require additional sensors within the chambers.

SUMMARY

The present invention is, in part, directed to a method of measuring an environmental contaminant that includes the steps of dividing a target environment into a plurality of spaces, placing a monitor in each of the plurality of spaces, uploading device data from each monitor, and processing the device data. Each monitor is configured to measure a level of an environmental contaminant within the space for a sample period and the device data is processed to determine a level of environmental contamination within each of the plurality of spaces over the sample period.

According to some implementations, the sample period is substantially contemporaneous for each of the plurality of spaces.

According to some implementations, the sample period is subdivided into a plurality of incremental time periods. Furthermore, in some particular implementations, the sample period is one or more days and each incremental time period is less than or equal to one hour.

According to some implementations, prior to uploading the device data from each monitor, the monitor is retrieved from the target environment. Furthermore, in some particular implementations, the device data is uploaded onto a receiving device via a wired connection, while in some other particular implementations, the device data is uploaded onto a receiving device via a wireless connection. Further still, in some particular implementations, the device data is uploaded onto a receiving device and the method further includes a step of transferring the device data from the receiving device to a remote computer where the device data is processed. In some specific implementations, the remote computer is a cloud computer.

According to some implementations, the method further includes providing a report of the level of environmental contamination within each of the plurality of spaces of the target environment over the sample period.

According to some implementations, the target environment is a single building envelope, but in other implementations, the target environment includes a plurality of building envelopes.

According to some implementations, each of the plurality of spaces of the target environment is independent from the other of the plurality of spaces.

According to some implementations, each monitor includes a radon sensor and the level of environmental contamination measured is a radon concentration. In some particular implementations, the device data includes measured radon decay events counted over each of a plurality of incremental time periods that make up the sample period.

To this end, the present invention is further directed to a radon monitor including a radon sensor configured to detect radon decay events; an environmental sensor configured to measure an ambient condition of air surrounding the radon sensor; a processor configured to record device data including a count of a number of radon decay events detected by the radon sensor over each of a plurality of incremental time periods and the ambient condition during each of the plurality of incremental time periods; and a communication means for transmitting the device data.

According to some exemplary embodiments, the radon sensor is surrounded by a substantially spherical chamber made of stainless steel.

According to some exemplary embodiments, the communication means includes a radiofrequency transceiver for wirelessly transmitting the device data.

The present invention is further directed to a system for measuring an environmental contaminant. The system includes a plurality of monitors configured for placement within a target environment for a sample period, each monitor including a radon sensor configured to detect radon decay events, an environmental sensor configured to measure an ambient condition of air surrounding the radon sensor, a processor configured to record device data including a count of a number of radon decay events detected by the radon sensor over each of a plurality of incremental time periods that make up the sample period and the ambient condition during each of the plurality of incremental time periods, and a communication means for transmitting the device data. The exemplary system further includes a receiving device configured to receive the device data from each of the plurality of monitors and wirelessly transmit the device data, and a cloud computer configured to receive the device data from the receiving device and process the device data to determine a level of environmental contamination measured by each of the plurality of monitors over the sample period.

According to some exemplary embodiments, the device data for each monitor is uploaded onto the receiving device via a wired connection or a wireless connection after all of the plurality of monitors are removed from the target environment.

DESCRIPTION OF EXEMPLARY EMBODIMENTS

Figure 1:
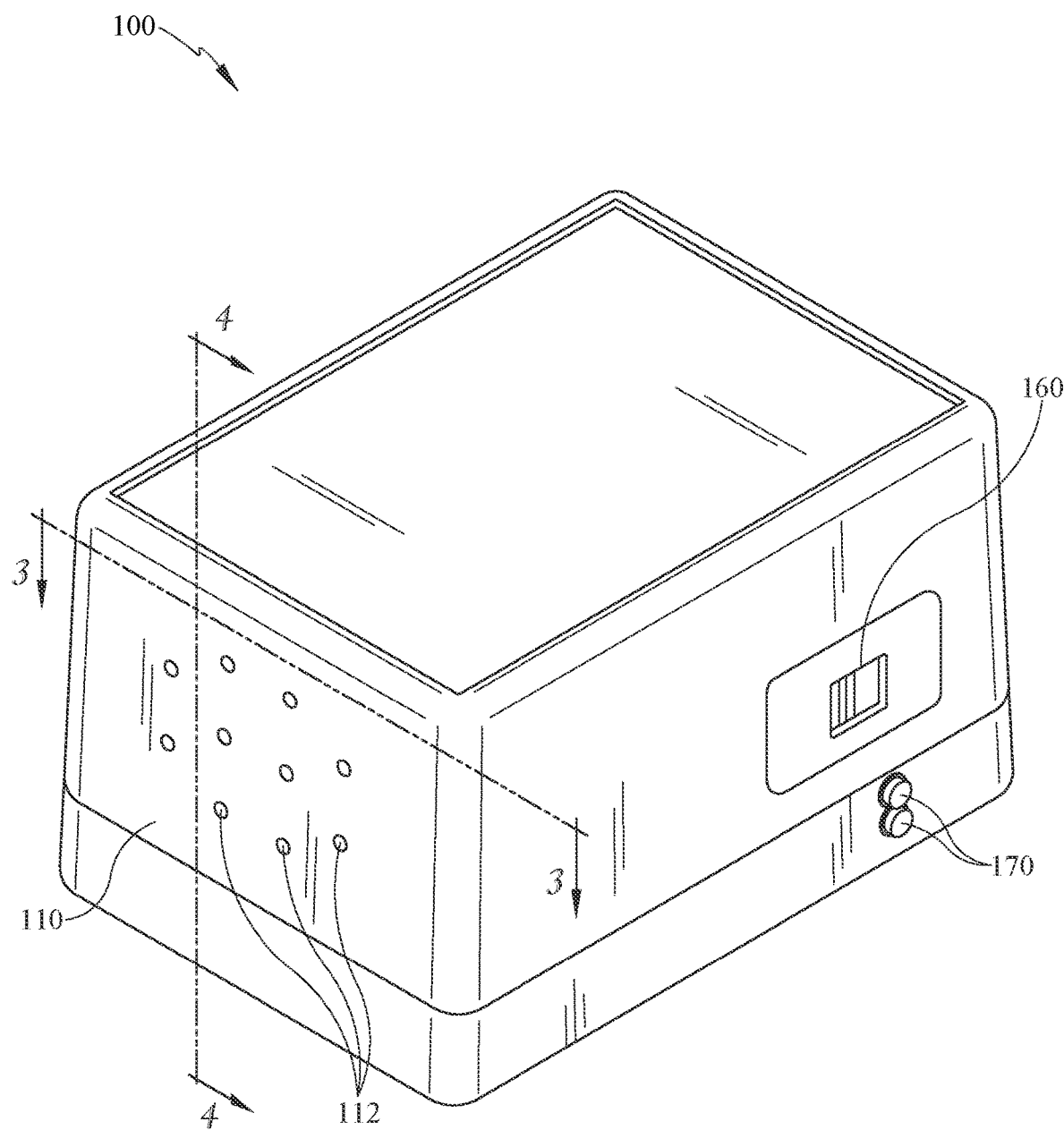
FIG. 1 a front perspective view of a radon monitor made in accordance with the present invention.
Figure 2:
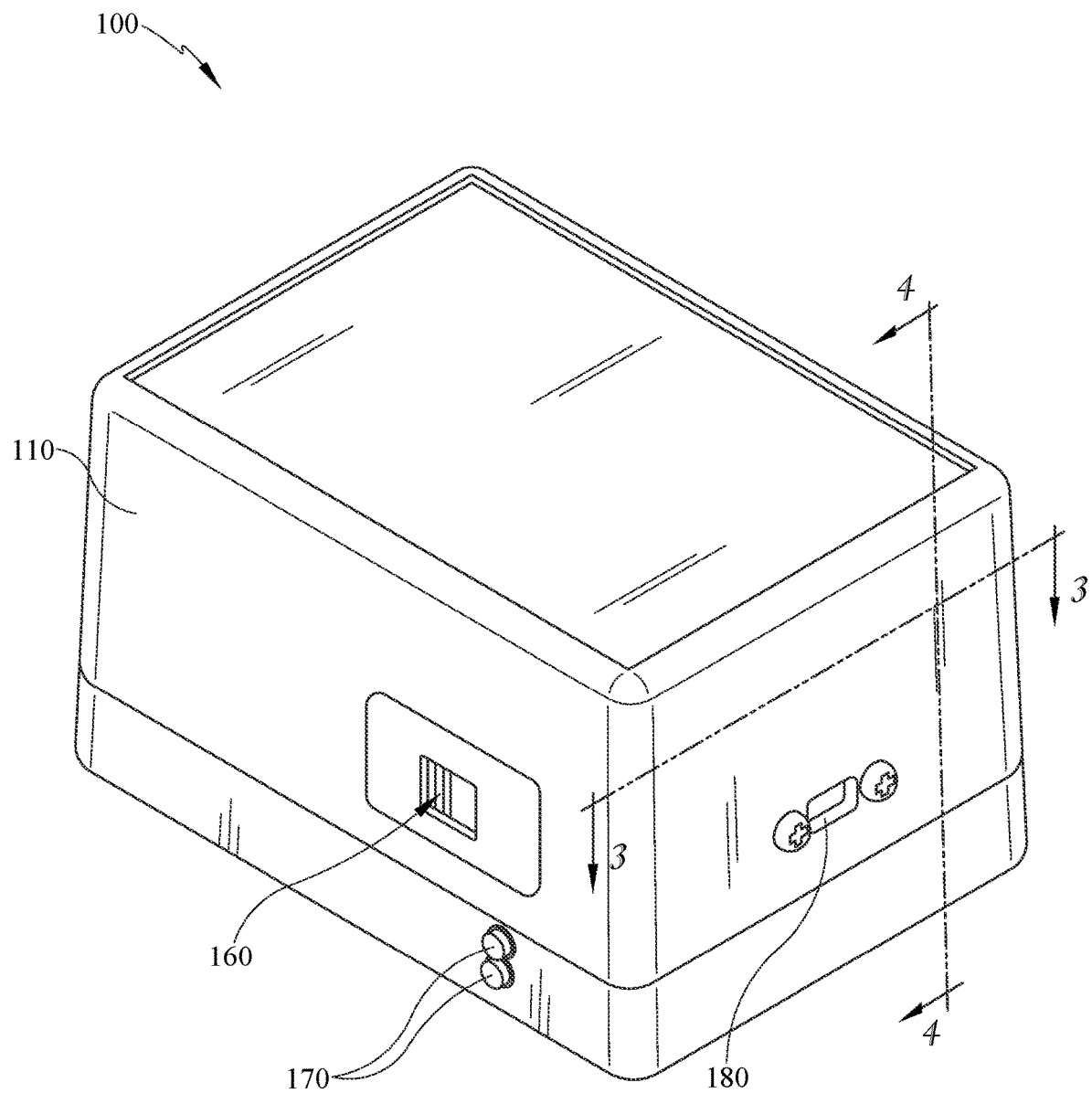
FIG. 2 is a rear perspective view of the radon monitor of FIG. 1.

The primary component of a system and method of continuous monitoring of an environmental contaminant is a continuous radon monitor (CRM). In property transaction assessments, the use of a CRM made and used in accordance with the present invention for analytical events requires no subsequent follow-up sampling.

The monitor of the present invention is configured for en mass deployment. As such, some exemplary monitors of the present invention forego an on-board user interface and analysis in favor of post-deployment analytics performed on a remote computer. This unique reduction in integrated components substantially reduces the size and weight of the monitor, as well as its production costs, without any degradation in performance. These reductions in size/weight and cost make their en masse deployment logistically and economically feasible, respectively. In addition, the absence of an on board user interface increases the integrity of the data as viewing and manipulation by unauthorized users during sampling deployment are not possible.

Referring first to FIGS. 1-4, one exemplary monitor 100 made in accordance with the present invention includes a radon sensor 120 partially surrounded by a chamber 130 which are both contained within an enclosure 110 with venting holes 112, which allow ambient air into the monitor 100 to surround the radon sensor 120 and chamber 130. The radon sensor 120 is configured to detect radon decay events. As used herein, the term "radon decay events" encompasses both radon decay and progeny decay.

Figure 3:
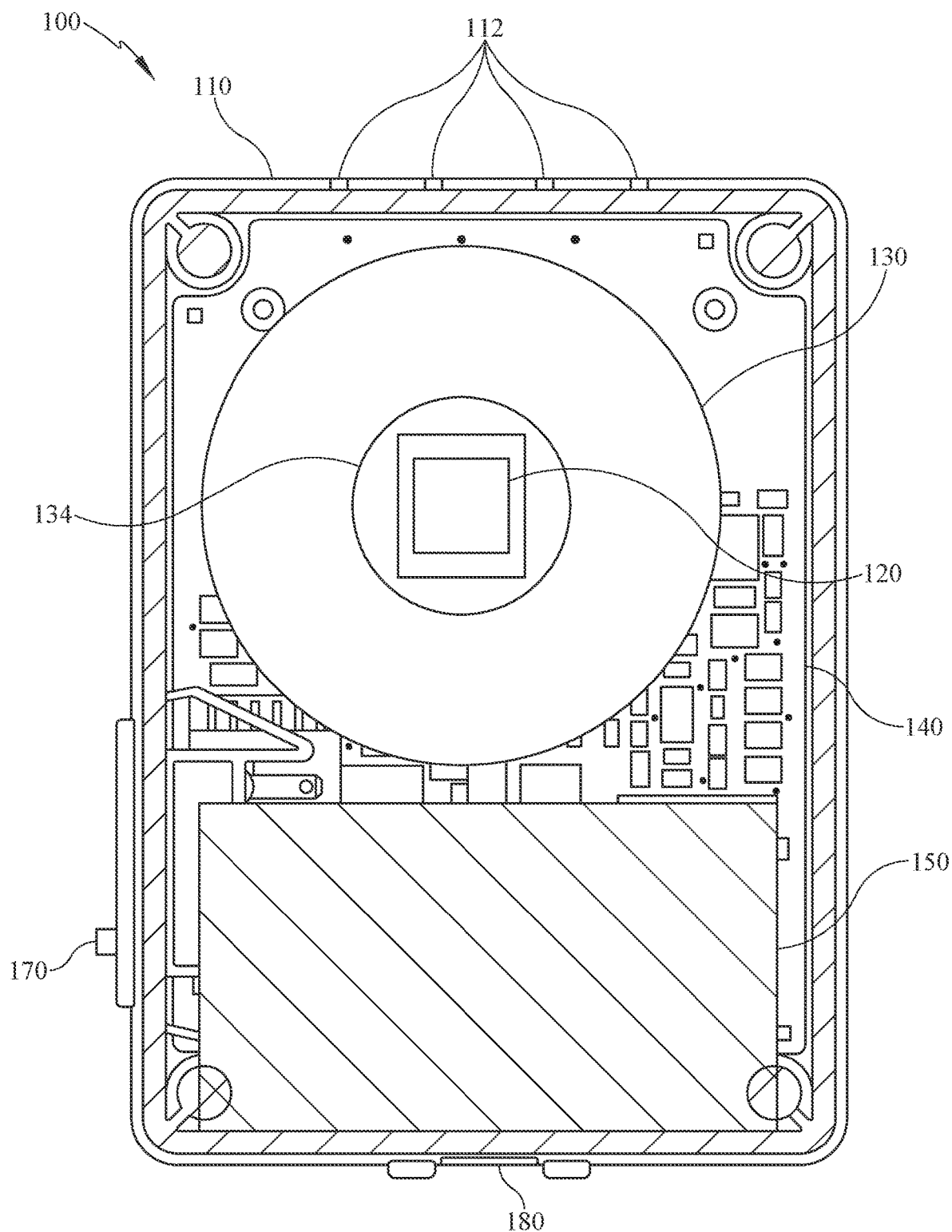
FIG. 3 is a top cross-sectional view of the radon monitor of FIG. 1 taken along line 3-3 shown in FIGS. 1 and 2.
Figure 4:
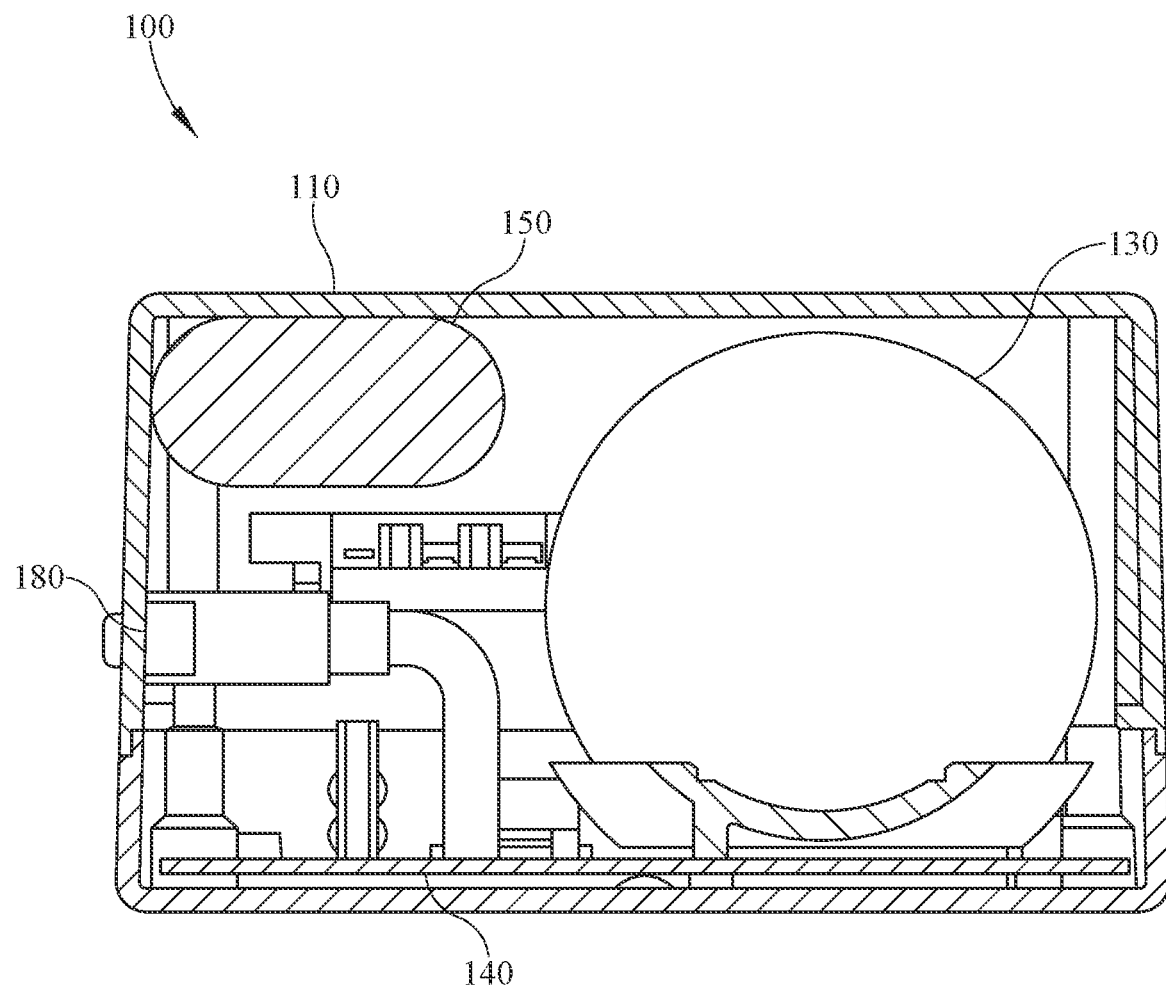
FIG. 4 is side cross-sectional view of the radon monitor of FIG. 1 taken along line 4-4 shown in FIGS. 1 and 2.

Referring now more specifically to FIGS. 3-4, in the exemplary embodiment, the radon sensor 120 is in the form of a 1.0 cm$^2$ silicon photodiode detector positioned at the base of a spherical chamber 130 with an opening 134 through which the radon sensor 120 extends. With respect to the radon sensor 120, the 1.0 cm$^2$ active area is contained within a non-hermetic ceramic carrier package with a glass window. The photodiode converts alpha particle strikes into an electrical voltage (photovoltaic effect) or photocurrent. A PIN diode of the sensor 120 comprises a near-intrinsic semiconductor region—usually the space-charge region—sandwiched between a p-type diode and an n-type substrate. A p-n junction in a silicon semiconductor serves as the physical basis for this process. When photons and/or radioactive decay particles with sufficient energy strike the detector, it results in the formation of charge carriers (electron-hole pairs), which are separated in the space-charge region and thus generate the photocurrent. While the charge separation occurs without the application of an external voltage, the process can be accelerated by use of a reverse voltage. Application of an external voltage in the reverse direction is ideal for applications in which a rapid signal response is required. The main disadvantage is the dark current, which grows exponentially with the temperature. The exemplary radon sensor 120 provides for a low dark current with a high shunt resistance and high sensitivity. Of course, other radon sensors can be incorporated into the monitor of the present invention without departing from the spirit and scope of the present invention.

The chamber 130 is a 100 cm$^3$ sphere with a 1.0 inch (2.54 cm) diameter opening 134, but the particular dimensions of an exemplary chamber used in accordance with the present invention can, of course, readily be chosen based on the overall design considerations of the monitor 100. Likewise, in the shown embodiment, the spherical chamber 130 is made of stainless steel, but other suitable materials are also contemplated. The exemplary spherical chamber 130 maintains a surficial electrical charge of about 350 volts. When radon atoms decay within the spherical chamber 130, the radioactive radon decay progeny is repelled by the electrically charged surface of the spherical chamber 130 and preferentially deposited on the surface of the silicon photodiode detector 120. The subsequent decay of these short-lived particles is then measured by the silicon photodiode detector 120.

As discussed above, the spherical chamber 130 serves to create an electrostatic field. As radon decays inside the sphere 130, the resulting charged particles are driven to the sensor 120 by the established electrostatic field. The spherical shape optimizes chamber volume to charged surface area, and minimizes/eliminates dead zones in the charge field relative to common cylindrical chamber geometries.

Figure 5:
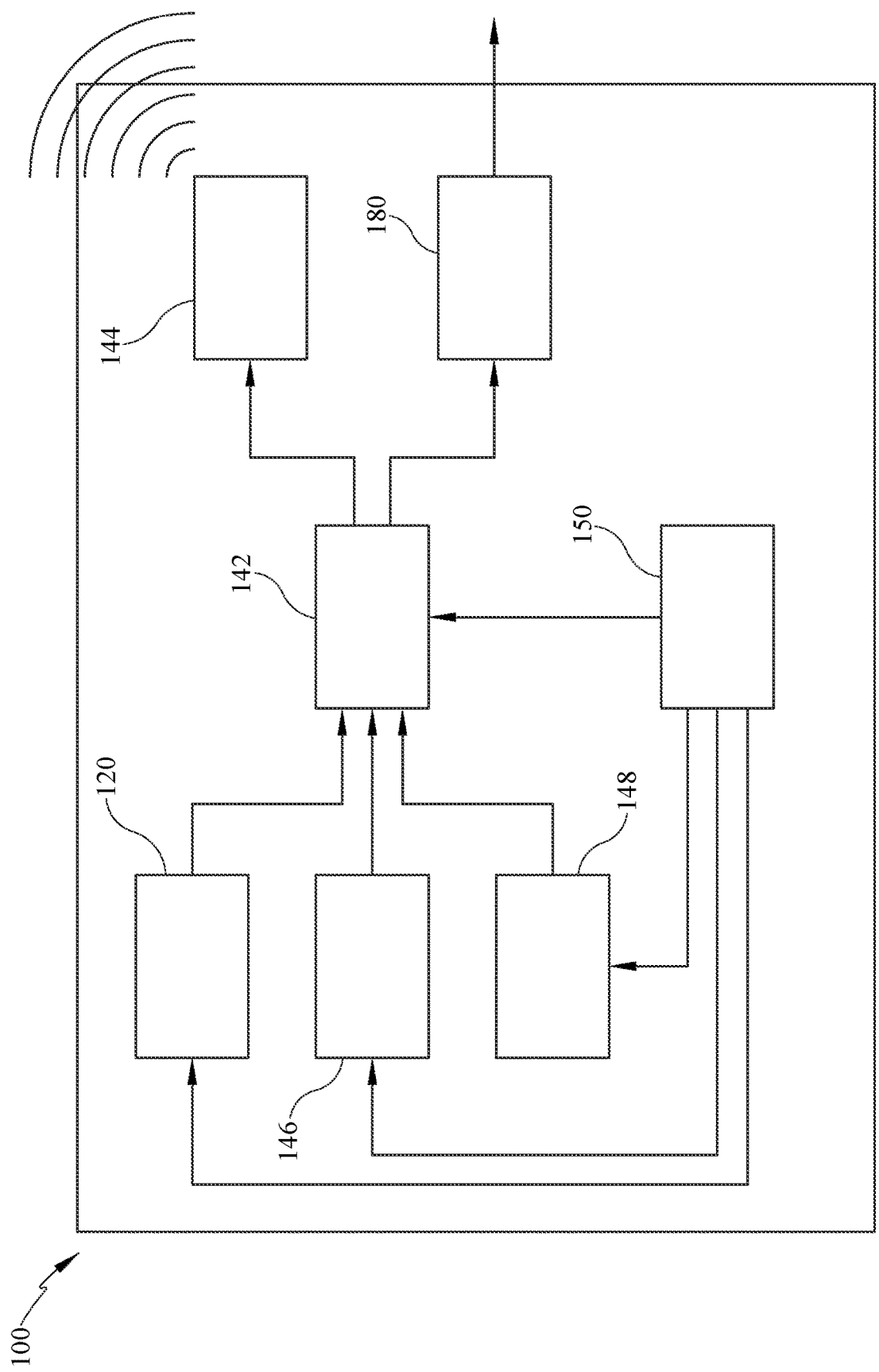
FIG. 5 is a schematic of the radon monitor of FIG. 1.

The radon sensor 120 detects decay events which are recorded along with a time of the decay event and its relative decay energy. To this end, and as shown in FIG. 5, the exemplary monitor 100 further includes a processor 142 for recording the decay events as device data along with performing other operations of the monitor 100, as discussed further below. The exemplary processor 142 includes a series of low-power microcontrollers with up to 256 KB Flash and 32 KB of SRAM. The processor 142 operates at a maximum frequency of 48 MHz and reach 2.46 CoreMark/MHz. It is capable of in-system programmable Flash, 12-channel Direct Memory Access Controller (DMAC), 12-channel Event System, programmable Interrupt Controller, up to 52 programmable I/O pins, 32-bit Real-Time Clock and Calendar (RTC), up to five 16-bit Timer/Counters (TC) and up to four 24-bit Timer/Counters for Control (TCC), where each TC can be configured to perform frequency and waveform generation, accurate program execution timing or input capture with time and frequency measurement of digital signals. The TCs can operate in 8-bit or 16-bit mode, selected TCs can be cascaded to form a 32-bit TC, and three timer/counters have extended functions optimized for motor, lighting, and other control applications. The processor 142 provides for USB device interface, as discussed further below, and up to six Serial Communication Modules (SER-COM) that each can be configured to act as an USART, UART, SPI, I2C up to 3.4 MHZ, SMBus, PMBus, and LIN client. The processor 142 has accurate and low-power external and internal oscillators. All oscillators can be used as a source for the system clock. Different clock domains can be independently configured to run at different frequencies, enabling power saving by running each peripheral at its optimal clock frequency, and thus maintaining a high CPU frequency while reducing power consumption. The processor 142 further includes an idle mode, in which the CPU is stopped while all other functions can be kept running, and a stand-by mode, in which all clocks and functions are stopped, except those selected to continue running. The processor 142 further allows the CPU to wake up only when needed, for example, when a threshold is crossed or a result is ready. Of course, other processors can be incorporated into the monitor of the present invention without departing from the spirit and scope of the present invention.

Referring still to FIG. 5, the exemplary monitor 100 further includes various additional sensors 146, 148 in addition to the radon sensor 120. Specifically, on board environmental sensors 146 are included to measure ambient conditions (e.g., temperature, relative humidity, barometric pressure, and VOC) and motion sensors 148 are included to monitor motion (e.g., device tamper indication). The data from these additional sensors 146, 148 is also recorded by the processor 142 as device data.

The exemplary environmental sensor 146 is a gas sensor that integrates high-linearity and high-accuracy gas, pressure, humidity and temperature sensors. It is configured to detect a broad range of gases such as volatile organic compounds (VOC). The pressure sensor is an absolute barometer pressure sensor with high accuracy and resolution at low noise. The temperature sensor is also optimized for high resolution and low noise. Of course, other environmental sensors can be incorporated into the monitor of the present invention without departing from the spirit and scope of the present invention.

Referring still to FIG. 5, the exemplary monitor 100 further includes communication means 144, 180, for uploading device data from the monitor 100. Once again, in some preferred embodiments, the monitor 100 itself does not contain a user interface or analytical programming to assess the concentration of radon. Rather, the monitor 100 uploads the device data via a wired connection 180 and/or wireless connection 144. This device data is then used to calculate radon concentrations based upon a device-specific calibration profile, as discussed further below.

As previously mentioned, the exemplary processor 142 provides for a USB device interface for the exemplary wired connection 180 (e.g., a micro USB port). The exemplary wireless connection 144 is an inexpensive and versatile radio module that operates in the unlicensed ISM (Industry, Science and Medicine) band, a set of frequencies set aside for low-power, short-range, license-free radios. Specifically, the wireless connection 180 is a 915 MHz RF transceiver capable of transmitting at up to 100 mW and up to 300 kbps. By changing one or both of these values, it is possible to maximize range by increasing the transmit power and reducing the data rate, or you can reduce both for short-range sensor networks that minimize power use. At full power and with simple wire antennas, it is possible to transmit from one side of a large office building to the other through numerous internal walls. In open air, the exemplary wireless connection 180 can reach 500 meters or more. Of course, other wireless connections can be incorporated into the monitor of the present invention without departing from the spirit and scope of the present invention. For example, while 915 MHz may be appropriate for use in the Americas, a 434 MHz transceiver may be used in Europe, Asia and Africa.

Referring now to FIGS. 1-5, the monitor 100 includes a power supply 150 to provide power to the processor 142 and sensors 120, 146, 148. For example, the exemplary power supply is a 3.6 V-6,500 mAh Lithium Ion battery which is capable of providing about 48-72 hours of operation of the monitor 100, but in other embodiments, an exemplary monitor can be powered via an external power source. Likewise, a power switch 160 and indicator lights 170 are included in the exemplary monitor 100 shown in FIGS. 1-4, but other configurations are contemplated without departing from the spirit and scope of the present invention. The indicator lights 170 allow for easy visual confirmation of various operations of the monitor 100. For example, exemplary indicator lights can provide information related to: the monitor is on/off; the monitor is charging; a communication status; the monitor is operating normally; a battery failure; an operational failure; a motion indication; or a variety of other status indications.

Although not expressly shown in FIGS. 1-4, the exemplary monitor 100 of the present invention is configured to either be wall-mounted vertically or table-mounted horizontally, as discussed further below. Furthermore, a tri-pod can be utilized for mounting vertically or horizontally.

Figure 6:
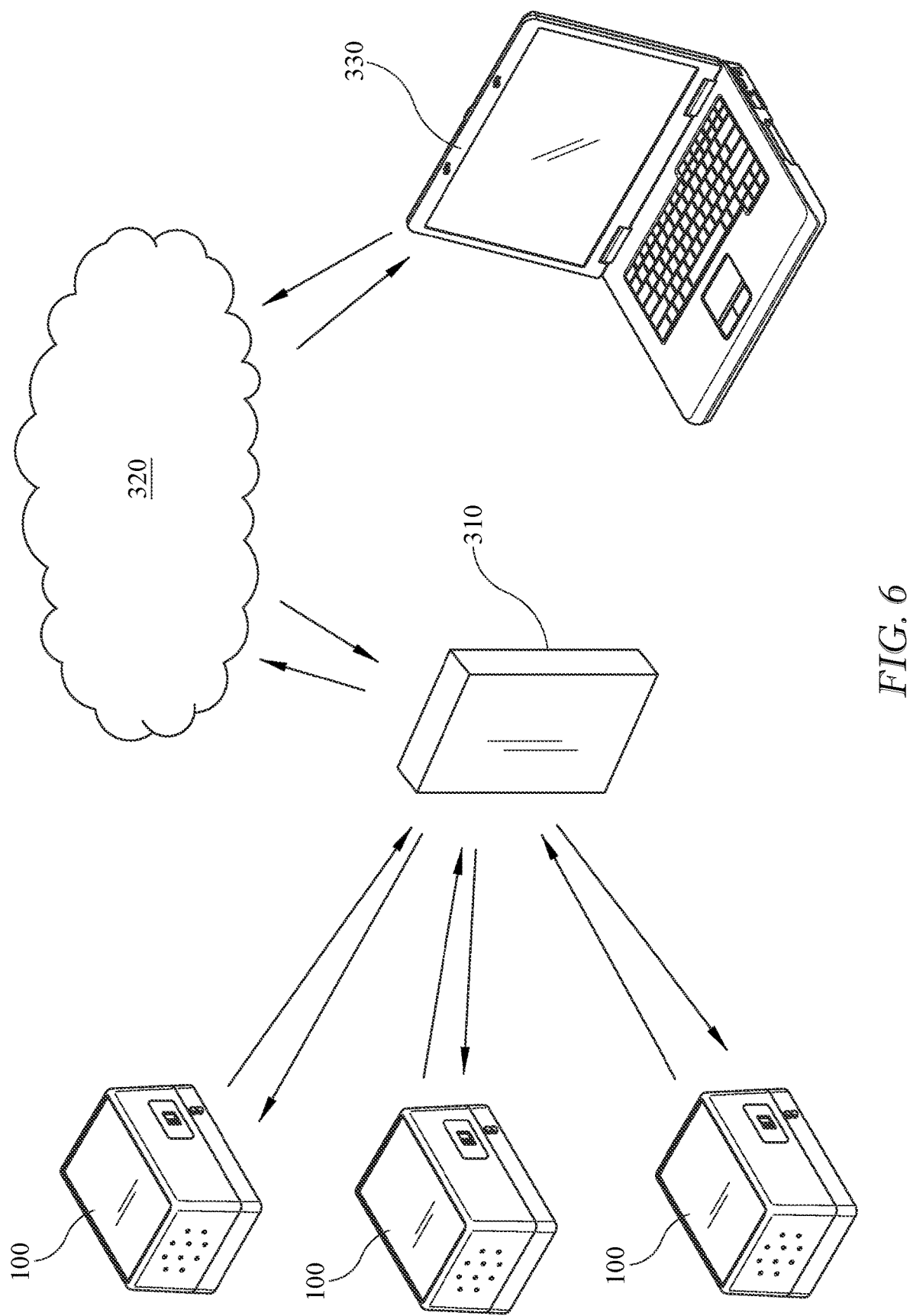
FIG. 6 is a schematic of an exemplary system for continuous radon monitoring made in accordance with the present invention.

In one exemplary system of the present invention, and referring now to FIG. 6, a plurality of exemplary monitors 100, which are configured to measure a level of an environmental contaminant (e.g., radon), are utilized. It is contemplated that the monitors 100 can be deployed in quantities of 1 to 5,000, although there is no limit to the maximum number of devices deployed. As discussed in detail below, the plurality of monitors 100 are placed throughout a target environment. At the time of deployment, during operation, and/or upon retrieval, the monitors 100 are connected to a receiving device 310 either via a wired connection or wireless connection and device data is uploaded to the receiving device 310. The device data is then uploaded to cloud storage 320 where it can be accessed by a computer 330. The computer 330 then processes the device data to determine a level of environmental contamination.

The system shown in FIG. 6 is merely exemplary and other configurations are possible without departing from the spirit and scope of the present invention. For example, the plurality of monitors 100 may, in some other embodiments, directly upload device data to the cloud storage 320. Likewise, the device data may, in some other embodiments, be accessed by the computer 330 directly from the receiving device 310 or the monitors 100 themselves. Furthermore, according to some embodiments, the cloud storage 320 may further be able to process the device data to determine a level of environmental contamination and the computer 330 is used to merely access the results. In other words, the monitors 100 and/or receiving device 310 may communicate with a cloud computer. Regardless of the particular configuration of the system, it is contemplated that device data is transferred to a remote computer (e.g., a cloud computer or computer 330) where the device data is processed rather than the monitor performing on-board processing of the device data.

Figure 7:
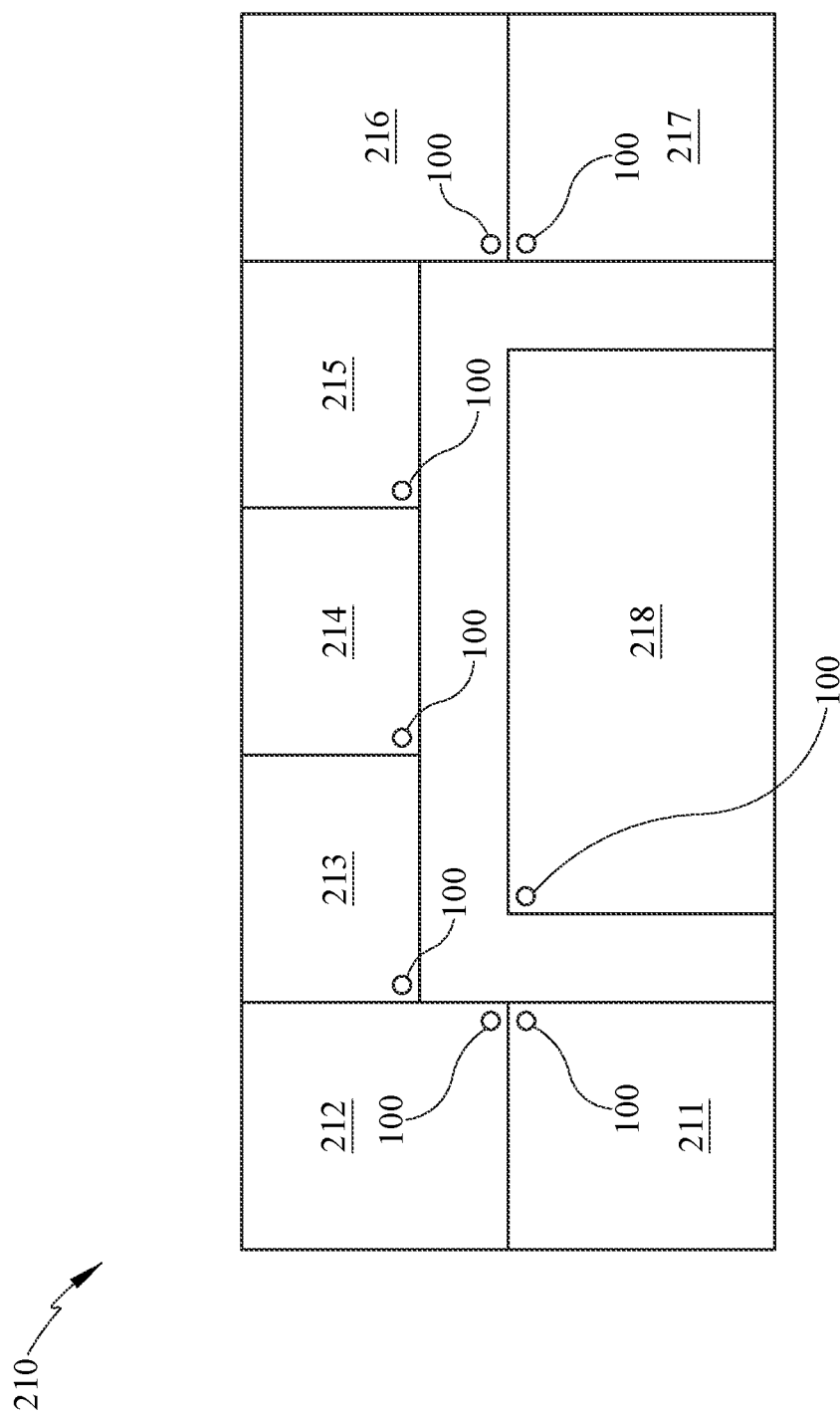
FIG. 7 is a schematic of one floor of an apartment building with a plurality of radon monitors deployed according to an exemplary implementation of the present invention.
Figure 8:
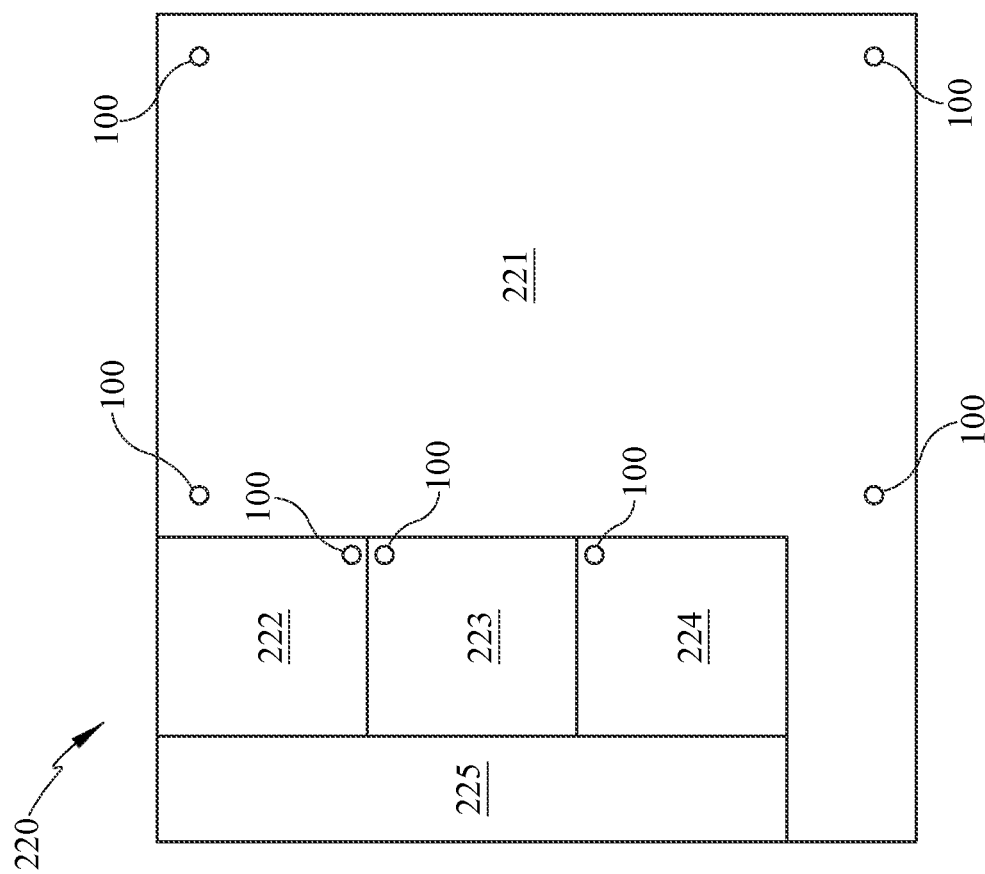
FIG. 8 is a schematic of a warehouse with a plurality of radon monitors deployed according to an exemplary implementation of the present invention.
Figure 9:
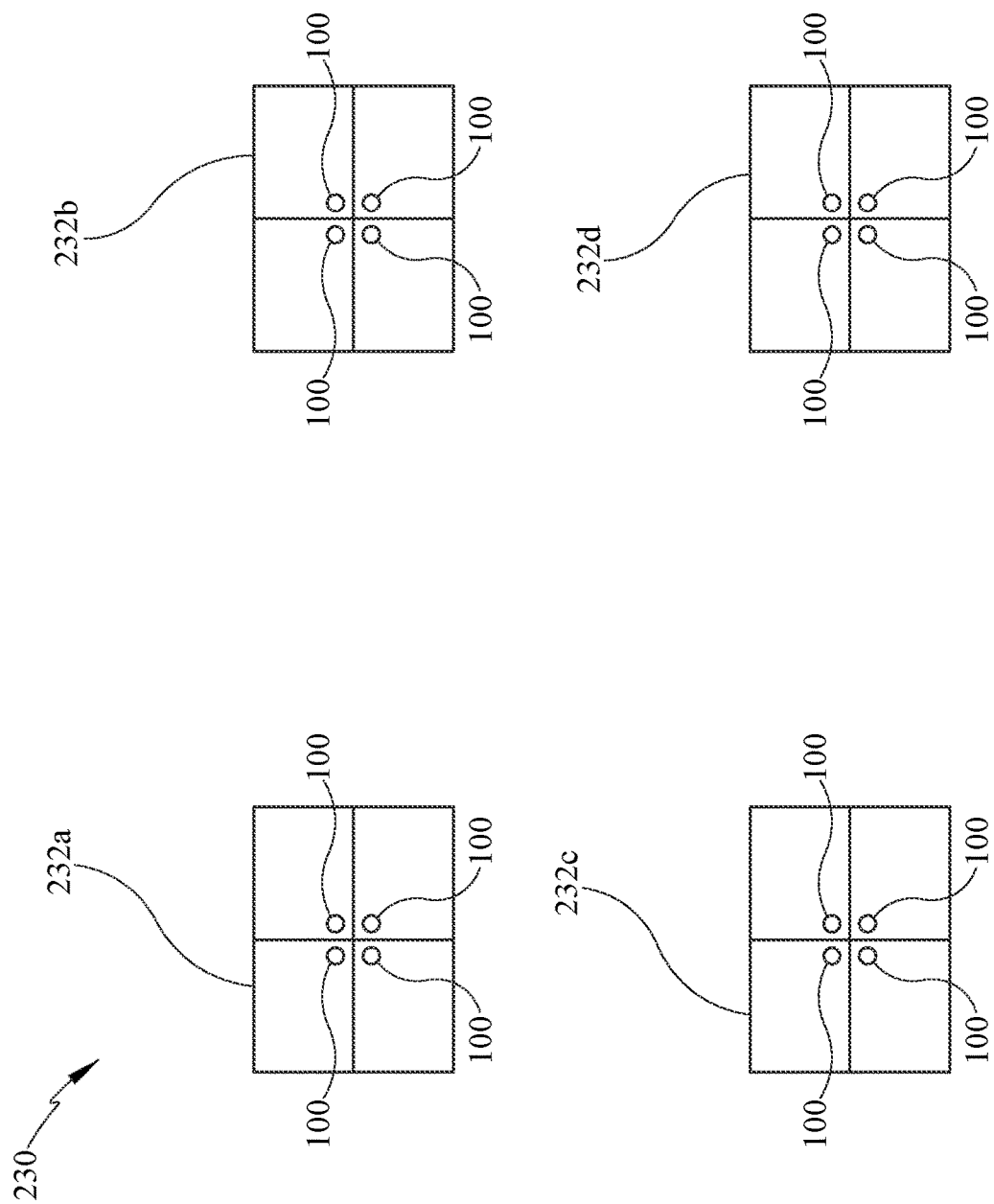
FIG. 9 is a schematic of an apartment complex with a plurality of radon monitors deployed according to an exemplary implementation of the present invention.

Referring now to FIGS. 7-9, the system and method of the present invention can be implemented across a variety of different target environments. For example, in one exemplary implementation shown in FIG. 7, the target environment is an apartment building 210 which is divided into a plurality of spaces 211-218 including individual apartment units 211-217 and a communal area 218. According to the exemplary implementation shown in FIG. 7, a monitor 100 is positioned within each of these spaces 211-218, but it is contemplated that one or more of the spaces 211-218 may alternatively not include a monitor without departing from the spirit and scope of the present invention. Moreover, as is typical of apartment buildings, although the apartment building 210 has a single building envelope, each of the spaces 211-218 is independent from each of the other spaces. That is to say, each of the spaces 211-218 has a climate managed independently through a separate, or zoned, HVAC system.

Referring now to FIG. 8, in another exemplary implementation of the present invention, the target environment is a warehouse 220 which is divided into a plurality of spaces 221-225 including a large storage space 221, several offices 222, 223, 224, and a hallway 225. The storage space 221 can be a substantially contiguous space which is managed as a single climate within the building envelope of the warehouse 220. The offices 222, 223, 224 and/or hallway 225 may each separately or collectively may be part of the same climate as the storage space 221 managed by a single HVAC system or they may each separately or collectively have a climate managed independent of the storage space 221 through a separate, or zoned, HVAC system. As shown in FIG. 8, it is contemplated that more than one monitor 100 can be used within a single space. Specifically, four monitors 100 are placed within the storage space 221. It is contemplated that for large contiguous spaces, e.g., contiguous spaces larger than 2,000 sq. ft., in some implementation of the present invention, multiple monitors 100 located throughout the space can capture the level of environmental contaminants within different regions of the large contiguous space.

Referring now to FIG. 9, in yet another exemplary implementation of the present invention, the target environment is an apartment complex 230 that includes multiple independent buildings 232a-232d that each include multiple (four) apartment units. In the exemplary apartment complex 230, each of the buildings 232a-232d are separate building envelopes, but similar to the implementation described above with respect to FIG. 7, each of the apartment units is independent from each of the other with a climate managed independently through a separate HVAC system. The apartment units, however, are further independent from each other in that there is separate ingress/egress for each of the apartment units. Once again, although FIG. 7 illustrates a monitor 100 within each of the four apartment units of each building 232a-232d, it is contemplated that one or more of the apartment units may alternatively not include a monitor without departing from the spirit and scope of the present invention. Although not shown in FIGS. 7-9, it is also contemplated that in some exemplary embodiments, a second monitor may be deployed adjacent to a primary monitor for quality assurance/quality control (QA/QC) protocol.

Figure 10:
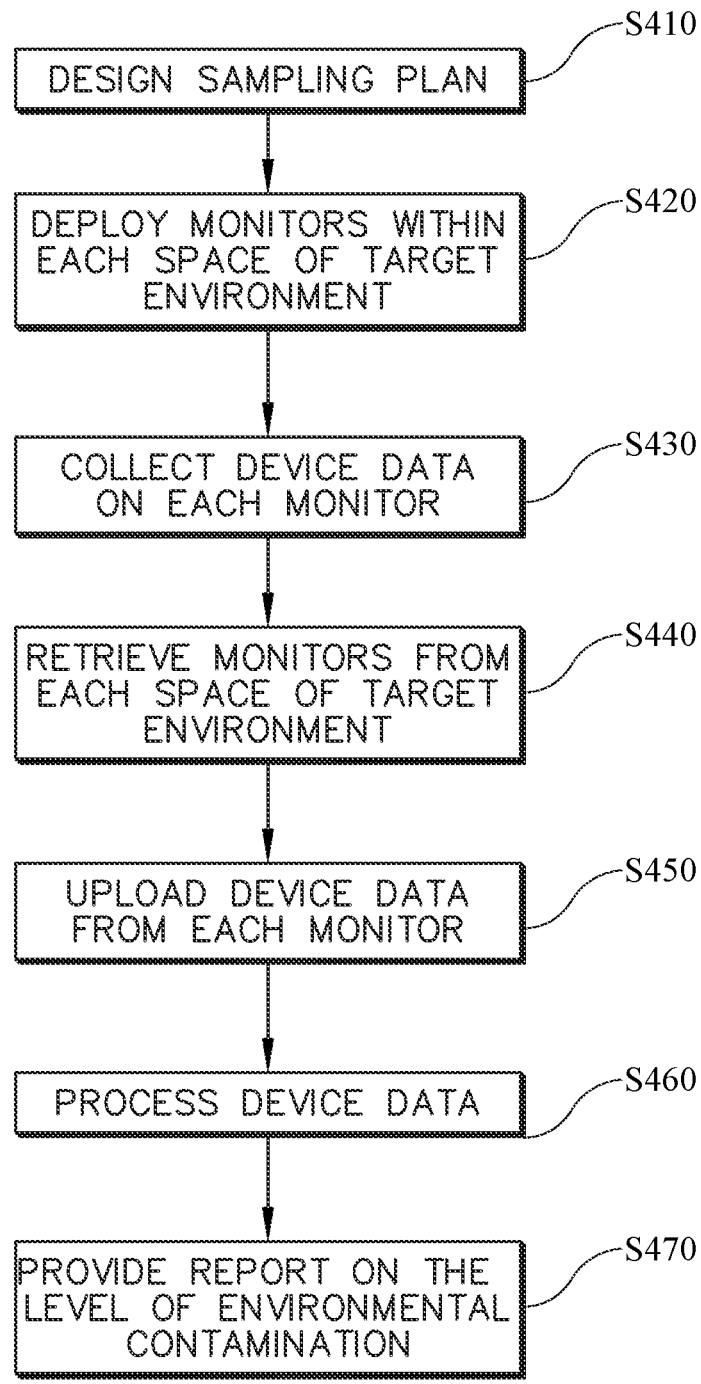
FIG. 10 is a flow diagram of one exemplary method of measuring an environmental contaminant implemented in accordance with the present invention.

Referring now to FIG. 10, in one exemplary implementation of a method of the present invention, in an initial step S410, a sampling plan is designed for a target environment with procedures appropriate to the property and the specific evaluation. Specifically, the target environment is divided into a plurality of spaces and it is determined which of the spaces require a measurement of a level of environmental contamination within the space. A minimum sample period is also determined based on the size and shape of the building as well as its use and this sample period is divided into a plurality of incremental time periods. According to some exemplary implementations, a sample period of 48 hours divided into 15 minute incremental time periods is utilized.

Next, in step S420, a plurality of monitors are deployed throughout the target environment in accordance with the sampling plan. That is to say, a monitor is placed within each of the plurality of spaces of the target environment where the level of environmental contaminant is to be measured. Once each monitor is deployed (e.g., vertically or horizontally), the monitor is activated manually or remotely, for example by way of the wireless connection described above. Deployment device logs are recorded for each monitor including, for example, a device serial number, device location information (e.g. building name, unit number, room, etc.), and the time that each monitor is activated. This step is repeated until all of the monitors are deployed.

Next, in a step S430, each monitor is operated to collect device data on each monitor for the requisite sample period in accordance with the sampling plan (e.g., 48 hours). In particular, and with reference again to the exemplary monitor 100 shown in FIGS. 1-4, throughout the sample period, the radon sensor 120 detects individual radon decay events, the environmental sensors 146 measure the ambient condition of the air surrounding the radon sensor 120 (e.g., temperature, relative humidity, barometric pressure), and the motion sensor 148 monitors any motion of the monitor 100. The processor 142 collects and records the data from each of the sensors 120, 146, 148 along with time logs. Specifically, in some exemplary implementations, for each of the plurality of incremental time periods (e.g., 15 minutes) the number of radon decay events are counted, the ambient conditions are recorded, and any motion of the system which may indicate tampering is recorded. The device data therefore includes a number of data entries which correspond to each of the plurality of incremental time periods that make up the sample period. For example, with a 48 hour sample period with 15 minute incremental time periods, there are 192 incremental counts of decay events. The ambient conditions (temperature, relative humidity, and barometric pressure), are also determined for each 15 minute incremental time period, and device movements are noted within each 15 minute incremental time period to determine if the location has been altered (i.e. indication of tampering). According to some exemplary embodiments, no analysis is performed by the monitor outside of these data collection activities.

Once the monitors have been deployed for the requisite sample period, in a step S440, each monitor is deactivated manually, autonomously based on predetermined test interval, or remotely to cease data collection and the monitor is retrieved. Deployment device logs are again recorded for each monitor including, for example, a device serial number, device location information (e.g. building name, unit number, room, etc.), and the time that each monitor is deactivate. This is repeated until all of the monitors are retrieved and deactivated.

Next, in a step S450, after retrieving the monitors, each retrieved monitor is connected to a computer (e.g., receiving device 310), either via a wired connection (e.g., micro USB port 180) and/or wireless connection (e.g., 915 MHz RF transceiver 144) and the device data is uploaded to secure cloud storage (cloud storage 320), as discussed above with respect to FIG. 6.

Of course, because deployment and retrieval of the monitors will take some amount of time, according to some exemplary implementations, only a subset of the monitors will have device data during the deployment and retrieval (e.g., those monitors first deployed and/or the last monitors retrieved). However, at least some of the data collection occurs substantially contemporaneously for all of the monitors. In this way, during the course of data collection, the sample period is substantially contemporaneous for each of the plurality of spaces in which the monitors were deployed. To this end, according to some exemplary implementations, the sample period is chosen as the time when data collection occurs substantially contemporaneously for all of the monitors. In some other exemplary implementations, the sample period does not begin until the last monitor is deployed and the sample period ends when the first monitor is collected. Alternatively, in some further implementations, rather than retrieving each of the monitors prior to uploading the data, the device data can be collected from each monitor while leaving the monitor in place, for example to begin another sample period.

According to some implementations of the present invention, rather than uploading the device data after retrieving each monitor, the device data is uploaded prior to retrieving one or more of the monitors. For example, in certain situations, retrieval of one or more devices may be delayed due to a lack of access to the device (e.g., locked apartments). In such instances, because of the wireless communication capability of the monitor of the present invention, the device data can still be collected without physically retrieving the monitor. However, according to some implementations of the present invention, there is only one data upload per device per deployment. In other words, the monitors are not kept in the target environment over multiple sampling periods.

In a step S460, a remote computer processes the device data to determine a level of environmental contamination within each of the plurality of spaces over the sample period. For example, the processing steps can include compiling individual decay events, calculating the average hourly radon concentrations, calculating the sample period average radon concentration, and compiling time series ambient environment and/or motion conditions. In some exemplary implementations, the radon concentrations are based on the calibration record specific to each monitor. That is to say, the remote computer analysis utilizes the device-specific calibration value to translate the registered decays within a certain period of time (e.g., an hour) to the actual number of decays in that period of time, and thus generate the average radon concentration for that time period, and ultimately an average radon concentration for the entirety of the desired sample period. For each of the plurality of monitors, the monitors location within the target environment, the hourly average radon concentrations, sample period average radon concentration, and recorded environmental data is compiled and saved on a cloud-based database. In some exemplary implementations, a predetermined subset of initial time (e.g., the first four hours) of measurements are disregarded as the equipment requires time to equilibrate with the environment.

In a final step S470, a report is provided on the level of environmental contamination within each of the plurality of spaces of the target environment over the sample period. That is to say, the sampling information from all of the plurality of monitors deployed in accordance with the sampling plan is compiled into a single tabular report detailing, for example, property details, average sample period concentrations at each location, QA/QC analyses, and calibration credentials for each CRM device utilized. The average hourly radon concentration for the measurement period determined in each of the plurality of spaces making up the target environment is then the basis for comparison to action levels and thus recommendations as to the health risk and necessity of mitigation.

In some exemplary methods of the present invention, the digitally compiled results are used to generate comprehensive reporting on all devices deployed at a property. Draft reports are also immediately available for review upon completion of all device downloads, which could be prior to departing the property in the case of wired device downloads for small quantity deployments (e.g. <250 devices) or wireless device downloads for large quantity device deployments (e.g. >250 devices). This uniquely rapid collection, compilation, and analysis of en masse sampling deployments provides the potential for unprecedented turnaround of critical, time-sensitive analysis.

The monitor, system, and methods described herein are a unique application of existing radon detection methodology (silicon photodiode) in a minimal form factor that omits an on-board user interface and analysis components in favor of external analysis. The unique design of the monitor therefore sufficiently reduces the size/weight and cost of the device to make en masse deployment logistically and economically feasible compared to existing devices. Given the reduced size, weight, and costs of the monitor of the present invention, and the technical advantages of utilizing a CRM in property transactions, the application of the present invention provides a significant advantage over passive sampling devices traditionally utilized for en masse sampling.

The system and method of the present invention utilizes a unique assemblage of analytical equipment to allow for a novel approach to performing radon assessments en masse at a multiple housing and/or business structures. The resulting effect is more definitive and defensible analytical results in less time that avoids transactional delays.

Although the above description was described with reference to a monitor that includes a radon sensor for measuring a level of radon concentration, it is contemplated that a monitor made in accordance with the present invention can also include other sensors instead of, or in addition to, the radon sensor which are capable of measuring other environmental contaminants without departing from the spirit and scope of the present invention. The systems and methods described above can readily be adapted to measure environmental contaminants other than radon.

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method of measuring an environmental contaminant comprising:
   dividing a target environment into a plurality of spaces;
   placing a monitor in each of the plurality of spaces, each monitor configured to measure a level of an environmental contaminant within the space for a sample period;
   uploading device data from each monitor; and
   processing the device data to determine a level of environmental contamination within each of the plurality of spaces over the sample period,
   wherein the sample period is subdivided into a plurality of incremental time periods, and
   wherein the device data is uploaded from each monitor at predetermined time periods.

2. The method of claim 1, wherein the sample period is substantially contemporaneous for each of the plurality of spaces.

3. The method of claim 1, wherein the predetermined time periods for uploading the device data correspond to the plurality of incremental time periods of the sample period.

4. The method of claim 1, wherein the sample period is one or more days and each incremental time period is less than or equal to one hour.

5. The method of claim 1, wherein the device data is uploaded onto a receiving device and further comprising a step of transferring the device data from the receiving device to a remote computer where the device data is processed.

6. The method of claim 5, wherein the device data is uploaded onto the receiving device via a wired connection.

7. The method of claim 5, wherein the device data is uploaded onto the receiving device via a wireless connection.

8. The method of claim 5, wherein the remote computer is a cloud computer.

9. The method of claim 1, wherein, prior to uploading the device data from each monitor, the monitor is retrieved from the target environment.

10. The method of claim 1, further comprising providing a report of the level of environmental contamination within each of the plurality of spaces of the target environment over the sample period.

11. The method of claim 1, wherein the target environment is a single building envelope.

12. The method of claim 1, wherein the target environment includes a plurality of building envelopes.

13. The method of claim 1, wherein each of the plurality of spaces is independent from the other of the plurality of spaces.

14. The method of claim 1, wherein each monitor includes a radon sensor and the level of environmental contamination measured is a radon concentration.

15. The method of claim 14, wherein the device data includes measured radon decay events counted over each of a plurality of incremental time periods that make up the sample period.

16. The method of claim 14, wherein each monitor further comprises one or more environmental sensors, and wherein the level of environmental contamination measured further comprises ambient conditions of air surrounding the radon sensor.

17. A radon monitor comprising:
   a radon sensor configured to detect radon decay events;
   an environmental sensor configured to measure an ambient condition of air surrounding the radon sensor;
   a processor configured to record device data including a count of a number of radon decay events detected by the radon sensor over each of a plurality of incremental time periods and the ambient condition during each of the plurality of incremental time periods; and
   a communication means for transmitting the device data, wherein the processor is configured to upload the device data at predetermined time periods.

18. The radon monitor of claim 17, wherein the radon sensor is surrounded by a substantially spherical chamber made of stainless steel.

19. The radon monitor of claim 17, wherein the communication means includes a radiofrequency transceiver for wirelessly transmitting the device data.

20. A system for measuring an environmental contaminant comprising:
   a plurality of monitors configured for placement within a target environment for a sample period, each monitor including
     a radon sensor configured to detect radon decay events,
     an environmental sensor configured to measure an ambient condition of air surrounding the radon sensor, and
     a processor configured to record device data including a count of a number of radon decay events detected by the radon sensor over each of a plurality of incremental time periods that make up the sample period and the ambient condition during each of the plurality of incremental time periods, the processor further configured to upload the device data at predetermined time periods,
   a communication means for transmitting the device data;
   a receiving device configured to receive the device data from each of the plurality of monitors and wirelessly transmit the device data; and
   a cloud computer configured to receive the device data from the receiving device and process the device data to determine a level of environmental contamination measured by each of the plurality of monitors over the sample period.

21. The system of claim 20, wherein the device data for each monitor is uploaded onto the receiving device via a wired connection or a wireless connection concurrently with deployment of the monitor or after the monitor is removed from the target environment.

* * * * *